United States Patent [19]

Erpelding et al.

[11] Patent Number: 4,861,817

[45] Date of Patent: Aug. 29, 1989

[54] THERMOPLASTIC COMPOSITIONS BASED ON GRAFTED RUBBER AND POLYESTER, A PROCESS FOR THEIR MANUFACTURE, AND ARTICLES OBTAINED THEREFROM

[75] Inventors: Michel Erpelding, Saint Maximin; Jacques Vandome, Rantigny, both of France

[73] Assignee: Societe Chimique des Charbonnages, France

[21] Appl. No.: 161,417

[22] Filed: Feb. 23, 1988

Related U.S. Application Data

[63] Continuation of Ser. No. 826,964, Feb. 7, 1986, abandoned.

[30] Foreign Application Priority Data

Feb. 8, 1985 [FR] France .................................. 85 01770

[51] Int. Cl.$^4$ ...................... C08L 51/04; C08L 51/06; C08L 55/02
[52] U.S. Cl. .................................. 524/411; 524/412; 524/513; 525/64
[58] Field of Search ................... 525/64; 524/411, 412, 524/513

[56] References Cited

U.S. PATENT DOCUMENTS

| | | | |
|---|---|---|---|
| 3,954,903 | 5/1976 | Kudo | 525/64 |
| 4,148,956 | 4/1979 | Breitenfellner | 428/156 |
| 4,292,233 | 9/1981 | Binsack et al. | 525/69 |
| 4,342,846 | 8/1982 | Silberberg | 525/64 |
| 4,373,067 | 2/1983 | Dieck et al. | 525/146 |
| 4,485,212 | 11/1984 | Wefner | 525/64 |

FOREIGN PATENT DOCUMENTS

| | | |
|---|---|---|
| 0127452 | 12/1984 | European Pat. Off. . |
| 0135677 | 11/1985 | European Pat. Off. . |
| 57-065748 | 4/1982 | Japan ...... 525/64 |
| 57-102946 | 6/1982 | Japan ...... 525/64 |
| 58-025356 | 2/1983 | Japan ...... 525/64 |

*Primary Examiner*—Patricia Short
*Attorney, Agent, or Firm*—Finnegan, Henderson, Farabow, Garrett & Dunner

[57] ABSTRACT

Thermoplastic composition based on a crystalline polyester and a modified vinyl aromatic polymer. It comprises:

from 50 to 97% by weight of at least one polymer phase (A) consisting of at least one terpolymer produced by grafting (a) at least one vinyl aromatic monomer and (b) at least one unsaturated nitrile onto (c) at least one rubber, the terpolymer being dispersed in a matrix of a copolymer comprising units derived from (d) at least one unsaturated nitrile and (e) at least one vinyl aromatic monomer, the overall composition of the polymer phase (A) being such that it contains from 17 to 35 parts of unsaturated nitrile, from 10 to 60 parts of rubber, and from 10 to 60 parts of vinyl aromatic monomer per 100 parts by weight of the polymer phase, and from 3 to 50% by weight of at least one high molecular weight polybutylene terephthalate (B).

11 Claims, No Drawings

4,861,817

THERMOPLASTIC COMPOSITIONS BASED ON GRAFTED RUBBER AND POLYESTER, A PROCESS FOR THEIR MANUFACTURE, AND ARTICLES OBTAINED THEREFROM

This application is a continuation, of application Ser. No. 826,964, filed Feb. 7, 1986, now abandoned.

BACKGROUND OF THE INVENTION

The present invention relates to thermoplastic compositions based on grafted rubber and polyester, a process for their manufacture, and industrial articles obtained from the compositions.

Examples in published European Patent Application No. 0,056,123 describe the preparation of a thermoplastic mass comprising 90% by weight of polybutylene terephthalate (PBTP) and 10% by weight of a grafted rubber, by mixing in an extruder at 250° C. the PBTP and a grafted rubber produced in an aqueous dispersion and containing 35% by weight of water.

A slightly modified impact-polystyrene comprising:
from 20 to 80% by weight of a vinylaromatic polymer modified by the presence of 5 to 15% by weight of an unsaturated nitrile and, where applicable, a rubber, and
from 20 to 80% by weight of a crystalline polyester having a molecular weight of preferably 10,000 to 60,000
is known from British Patent No. 2,118,194.

More precisely, Example 6 of this document describes a mixture of 75% by weight of a modified polystyrene (consisting of 84% by weight of styrene, 8% by weight of acrylonitrile and 8% by weight of rubber) and of 25% by weight of polybutylene terephthalate. This mixture has an Izod impact resistance of 49 J/m, considerably lower than that of the initial modified polystyrene.

Furthermore, French Patent No. 2,154,800, and especially its Example 20, discloses a mixture of 20% by weight of high molecular weight polybutylene terephthalate, 60% by weight of a terpolymer of acrylonitrile, butadiene and styrene, and 20% by weight of glass fiber reinforcement. This mixture has an Izod impact resistance of 65 J/m, well below that of a similar binary mixture in which the polybutylene terephthalate is replaced by the terpolymer of acrylonitride, butadiene, and styrene.

Thus, according to the teaching of the prior art, the introduction of 20 to 25% by weight of a high molecular weight crystalline polyester into a polymer based on styrene, acrylonitrile, and rubber results in a decrease in the impact strength of the composition, whether the latter is filled or not.

SUMMARY OF THE INVENTION

The present invention is based on the surprising finding that, contrary to the teaching of the prior art, the introduction of a minor proportion of a high molecular weight crystalline polyester into a polymer based on a vinylaromatic monomer, an unsaturated nitrile, and rubber enables the Izod impact strength, and incidentally other properties, of the composition to be significantly improved, provided that:
the crystalline polyester is polybutylene terephthalate, and
the polymer based on a vinylaromatic monomer, nitrile, and rubber is a specific polymer according to the present invention, different from the polymers used in the prior art.

In addition, the present invention is based on the surprising finding that the Izod impact strength and other properties of such compositions can be further improved by the addition of a third elastomeric component in a well-specified quantity.

Another advantage of the present invention is an improved processability for the conversion of these compositions into industrial articles.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the thermoplastic composition of the invention based on a crystalline polyester and a modified vinylaromatic polymer comprises:
from 50 to 97% by weight of at least one polymer phase (A) consisting of at least one terpolymer produced by grafting (a) at least one vinylaromatic monomer and (b) at least one unsaturated nitrile onto (c) at least one rubber, the terpolymer being dispersed in a copolymer matrix comprising units derived from (d) at least one unsaturated nitrile and (e) at least one vinylaromati monomer, the overall composition of the polymer phase (A) being such that it contains from 17 to 35 parts of unsaturated nitrile, from 10 to 60 parts of rubber and from 10 to 60 parts of vinylaromatic monomer per 100 parts by weight of the polymer phase, and
from 3 to 50% by weight of at least one high molecular weight polybutylene terephthalate (B).

Further to achieve the foregoing objects and in accordance with the purpose of the invention, as embodied and broadly described herein, the process for the manufacture of a composition according to the invention comprises mixing the polymer phase (A), the polybutylene terephthalate (B), and, where applicable, other components at a temperature above the melting temperature of the polybutylene terephthalate (B) for a sufficient time to produce a homogeneous composition.

Still further to achieve the foregoing objects and in accordance with the purpose of the invention, as embodied and broadly described herein, the invention comprises articles produced by injection molding, extrusion, or thermoforming of the composition of the invention.

DESCRIPTION OF THE PREFERRED EMBODIMENTS

Reference will now be made in detail to the presently preferred embodiments of the invention.

For proper understanding of the invention, it should be stated that:
The vinylaromatic monomer (a) and the vinylaromatic monomer (e), which are identical or different from each other, are preferably chosen from styrene and its derivatives such as alpha-methylstyrene, vinyltoluene and vinylnaphthalene,
the unsaturated nitrile (b) and the unsaturated nitrile (d), which are identical or different from each other, are preferably acrylonitrile,
the rubber (c) is preferably chosen from polybutadiene, polyisoprene, butadiene/isoprene copolymers, and ethylene-propylene and ethylene-propylene-diene elastomers, the weight average molecular weight or the polybutylene terephthalate is preferably between 15,000 and 150,000.

According to an improved embodiment, the thermoplastic composition according to the invention can additionally comprise at least one elastomer (C) in a proportion of up to 25 parts by weight, preferably 3 to 20 parts by weight, per 100 parts of the (A)+(B) mixture. Advantageously, the elastomer (C) can be chosen from:

ethylene/vinyl acetate copolymers comprising from 30 to 80% by weight of acetate and from 20 to 70% by weight of ethylene, these copolymers being generally produced by emulsion polymerization, butadiene/acrylonitrile copolymers comprising, for example, from 60 to 85% by weight of butadiene and from 15 to 40% by weight of acrylonitrile, acrylic elastomers such as, in particular, styrene/butyl acrylate/methyl methacrylate copolymers and styrene/butadiene/methyl methacrylate copolymers, copolymers of a saturated polyester and a polyester, such as, in particular, the block copolymers of poly(butylene terephthalate) and of poly(tetramethylene glycol).

The thermoplastic composition according to the invention can, moreover, comprise at least one lubricant, preferably in a proportion of up to 4 parts by weight per 100 parts by weight of the (A)+(B) mixture or, where applicable, (A)+(B)+(C) mixture. Such a lubricant can be chosen, in particular, from:

the carboxylic acid salts of a metal chosen from the elements of groups IA, IIA, and IIB of the Periodic Classification, especially calcium, zinc, lithium, and magnesium stearates, oxidized polyethylene waxes, fatty acid esters such as glycerine, N,N'-ethylenebis(stearamide).

The thermoplastic composition according to the invention can, moreover, comprise at least one flame retardant. The flame retardant chosen will preferably be a system suitable for flame-retarding the major component of the composition, that is to say the phase (A). Such a system usually comprises at least one halogen compound and at least one metal oxide. The halogen compound, which can be chosen especially from brominated diphenyl ethers of tribromophenoxyethane, is preferably used in a proportion of up to 50 parts by weight per 100 parts by weight of phase (A). The metal oxide, which can be the antimony oxide $Sb_2O_3$ in particular, is preferably used in a proportion of upto 30 parts by weight per 100 parts by weight of phase (A).

In accordance with the invention, the process for manufacturing the compositions of the invention described above comprises mixing the phase (A) and the polybutylene terephthalate (B) and, where applicable, the other components such as the elastomer (C), the lubricant, and the flame retardant, at a temperature above the melting temperature of the polybutylene terephthalate (B) for a sufficient time to produce a homogeneous composition. The mixing temperature is preferably between 223° C. and 260° C.; the mixing time is advantageously between 1 and 4 minutes. The process according to the invention can be carried out in any device suitable for mixing polymers such as (A) and (B), for example a kneader or an internal mixer.

The compositions described above have a set of properties that are remarkable relative to those of the prior art, in particular:

an improved Izod impact strength (measured according to the ISO Standard R-180, equivalent to ASTM D 256), a higher Vicat temperature (measured according to the ISO Standard R-306, equivalent to ASTM D 1525), an improved multiaxial impact strength (measured according to the DIN standard 53 443), a higher hot flow index (measured according to the method described in the examples below).

This set of remarkable properties makes the compositions according to the invention especially advantageous from the standpoint of processability and for any applications requiring both good mechanical properties and good heat resistance.

Thus, in accordance with the present invention, the compositions described above are used to produce industrial articles by injection molding, extrusion, and thermoforming. Using the injection molding method, it is possible, in particular, to produce, by subjecting the composition to a temperature between 240° C. and 275° C., articles such as dashboards, consoles, and rear light casings for motor vehicles, meter or spotlight casings, air conditioning components, and the like. Using the extrusion method, it is possible, in particular, to produce sheets up to 3 meters in width and generally between 1 and 10 mm in thickness. These sheets are intended to be subjected to thermoforming, at a temperature increasing incrementally between 230° and 250° C., to produce articles such as casings and enclosures for electrical and electronic equipment, internal fittings for motor vehicles, and the like.

The present invention will also find applications in fields as diverse as furniture, luggage, boats and sailboards, building, caravans, motorcycles, domestic electrical appliances, office equipment, data processing, gardening equipment, refrigerators, radio, video, photographic and television equipment, skis, telephone and remote automation, pipework and connections, and motorcycle helmets.

The following examples are given by way of illustration of the present invention, without limiting it.

EXAMPLES 1 AND 2 (Comparative)

A composition comprising the following is prepared by mixing in an internal mixer rotating at a rate of 70 revolutions/min, at a temperature of 225° C. for 2 minutes:

a powdered polymer (A) marketed by the company CdF CHIMIE ABS under the trademark UGIKRAL TF, comprising 15% by weight of polybutadiene, 25% by weight of acrylonitrile, 15% by weight of styrene, and 45% by weight of alpha-methylstyrene, a lubricant prepared under the trademark SYMTEWAX by the company COMIEL, and where applicable (example 2), a flame retardant system consisting of octabromodiphenyl ether (OBDPE) and antimony oxide.

The quantities, expressed in parts by weight, of the various ingredients of the compositions are shown in Table 1 below.

The following properties are measured for the compositions prepared in this manner:

Izod impact strength expressed in J/m and determined at 23° C. on a notched bar specimen, 63.5×12.7×3.2 mm, in accordance with the ISO Standard R-180, Vicat temperature, expressed in degrees Centigrade and determined at 10 daN in accordance with the ISO Standard R-306, hot flow index (HFI), expressed in cm and determined as being the length travelled by the material injected at 270° C. into a spiral mold 2×12.5 mm in cross-section under the effect of a pressure of 100 MPa, multiaxial impact strength (MIS), expressed in J and determined at 23° C. in accordance with the DIN Standard 53443, limiting oxygen index (LOI), expressed in percent and determined according to ASTM Standard D 2863.

The results of these measurements are shown in Table I below.

EXAMPLES 3 TO 13

Compositions comprising the following, besides the polymer (A), the lubricant, and, where applicable, the flame retardant system, are prepared under the operating conditions (mixing temperature and time) of the preceding examples:

a polybutylene terephthalate (B) with a weight-average molecular weight of approximately 80,000, marketed by the company AKZO under the trademark ARNITE T08200, and where applicable, an elastomer (C) whose nature varies from one example to another. In examples 6 to 9 the elastomer is a copolymer containing 72% by weight of butadiene and 28% by weight of acrylonitrile, marketed by the company POLYSAR under the trademark KRYNAC 1403 H 176. In Example 10 the elastomer is a copolymer containing 70% by weight of vinyl acetate and 30% by weight of ethylene, marketed by the WACKER company under the name VAE 711. In Example 11 the elastomer is a poly(methyl methacrylate-butadiene-styrene) marketed by the Rohm & Haas Company under the trademark PARALOID KM 522. In Example 12 the elastomer is an acrylic polymer marketed by the Rohm & Haas Company under the trademark PARALOID KM 330. In Example 13 the elastomer is a poly(ester-ether) marketed by the DuPont de Nemours Company under the trademark HYTREL 4056.

The quantities, expressed in parts by weight, of the various ingredients are shown in Table I below, together with the results of the measurements of properties carried out on these compositions.

TABLE I

| EXAMPLE | 1 | 2 | 3 | 4 | 5 | 6 | 7 |
|---|---|---|---|---|---|---|---|
| (A) | 100 | 100 | 100 | 100 | 100 | 100 | 100 |
| Lubricant | 1 | 1 | 1 | 1 | 1 | 1 | 1 |
| OBDPE | 0 | 20 | 25.5 | 0 | 0 | 0 | 0 |
| Sb₂O₃ | 0 | 9 | 11.3 | 0 | 0 | 0 | 0 |
| (B) | 0 | 0 | 25 | 11.1 | 25 | 5.3 | 25 |
| (C) | 0 | 0 | 0 | 0 | 0 | 4.2 | 11.2 |
| Izod | 230 | 100 | 135 | 330 | 335 | 490 | 720 |
| Vicat | 113 | 104 | 106.5 | 113.8 | 115.8 | 113.5 | 114.8 |
| HFI | 39 | 45 | 49 | 47 | 54 | 40 | 48 |
| MIS | 30 | — | — | 36 | 40 | 35 | 35 |
| LOI | — | 25 | 25 | — | — | — | — |

| EXAMPLE | 8 | 9 | 10 | 11 | 12 | 13 |
|---|---|---|---|---|---|---|
| (A) | 100 | 100 | 100 | 100 | 100 | 100 |
| Lubricant | 1 | 1 | 1 | 1 | 0 | 0 |
| (B) | 42.8 | 73.3 | 25 | 25 | 25 | 25 |
| (C) | 21.4 | 11.2 | 7.5 | 10.1 | 5.1 | 10.1 |
| Izod | 840 | 350 | 430 | 445 | 325 | 375 |
| Vicat | 117.7 | 130 | 114.7 | 116.2 | 116.2 | 116.6 |
| HFI | 49 | 55 | 54 | 51 | 54 | 55 |
| MIS | 36 | 45 | 44 | | | |

EXAMPLE 14 (Comparative)

A composition comprising the following is prepared under the operating conditions (mixing temperature and time) of the preceding examples:

100 parts by weight of a powdered polymer (A) marketed by the company CdF CHIMIE ABS under the trademark UGIKRAL SN, containing 57% by weight of styrene, 24% by weight of acrylonitrile, and 19% by weight of polybutadiene, and 3 parts by weight of N,N′-ethylenebis(stearamide).

The results of the measurements of properties of this composition are shown in Table II below.

EXAMPLE 15

A composition containing, besides the ingredients of Example 14:

11.1 parts by weight of the polybutylene terephthalate (B) employed in Examples 3 to 13, 4.5 parts by weight of the elastomer employed in Examples 6 to 9, is prepared under the operating conditions of the preceding examples.

The results of the measurements of properties of this composition are shown in Table II below.

TABLE II

| Example | Izod | Vicat | HFI |
|---|---|---|---|
| 14 | 290 | 98.7 | 63 |
| 15 | 335 | 100.6 | 65.5 |

It will be apparent to those skilled in the art that various modifications and variations could be made in the composition, process, and articles of the invention without departing from the scope or spirit of the invention.

What is claimed is:

1. Thermoplastic composition based on a crystalline polyester and a modified vinylaromatic polymer consisting essentially of:
   (1) from 80 to 90% by weight based on the total weight of the thermoplastic composition of at least one polymer phase (A) comprising at least one terpolymer produced by grafting (a) at least one vinylaromatic monomer and (b) at least one unsaturated nitrile onto (c) at least one rubber, said terpolymer being dispersed in a matrix of a copolymer comprising units derived from (d) at least one unsaturated nitrile and (e) at least one vinylaromatic monomer, the overall composition of the polymer phase (A) being such that it contains from 17 to 35 parts of unsaturated nitrile, from 10 to 60 parts of rubber, and from 10 to 60 parts of vinylaromatic monomer per 100 parts by weight of said phase and,
   (2) from 10 to 20% by weight based on the total weight of the thermoplastic composition of at least one high molecular weight polybutylene terephthalate (B), the polybutylene terephthalate having a molecular weight between 80,000 and 150,000 weight average molecular weight,
the thermoplastic composition having a Vicat softening point above 113° C. and an Izod impact strength not below 330 J/m.

2. Composition according to claim 1, wherein said vinylaromatic monomer (a) and said vinylaromatic monomer (e), are identical or different from each other and are selected from the group consisting of styrene and its derivatives.

3. Composition according to claim 2, wherein said vinylaromatic monomer (a) and said vinylaromatic monomer (e) are selected from the group consisting of styrene, alpha-methylstyrene, vinyltoluene, and vinylnaphthalene.

4. Composition according to claim 1, wherein said unsaturated nitrile (b) and said unsaturated nitrile (d) are both acrylonitrile.

5. Composition according to claim 1, wherein said rubber (c) is selected from the group consisting of polybutadiene, polyisoprene, butadiene/isoprene copolymers, and ethylene-propylene and ethylene-propylene-diene elastomers.

6. Composition according to claim 1, further comprising at least one flame retardant.

7. Composition according to claim 6, wherein said flame retardant Comprises at least one halogen compound and at least one metal oxide.

8. Composition according to claim 7, wherein said halogen compound is present in a proportion of up to 50 parts by weight per 100 parts of phase (A).

9. Composition according to claim 7, wherein said metal oxide is antimony oxide $Sb_2O_3$, present in a proportion of up to 30 parts by weight per 100 parts of phase (A).

10. Articles produced by injection molding, extrusion, or thermoforming a composition according to claim 1.

11. Thermoplastic composition based on a crystalline polyester and a modified vinylaromatic polymer consisting essentially of:
(1) from 80 to 90% by weight based on the total weight of the thermoplastic composition of at least one polymer phase (A) comprising at least one terpolymer produced by grafting (a) at least one vinylaromatic monomer and (b) at least one unsaturated nitrile onto (c) at least one rubber, said terpolymer being dispersed in a matrix of a copolymer comprising units derived from (d) at least one unsaturated nitrile and (e) at least one vinylaromatic monomer, the overall composition of the polymer phase (A) being such that it contains from 17 to 35 parts of unsaturated nitrile, from 10 to 60 parts of rubber, and from 10 to 60 parts of vinylaromatic monomer per 100 parts by weight of said phase and,
(2) form 10 to 20% by weight based on the total weight of the thermoplastic resin of at least one high molecular weight polybutylene terephthalate (B), said vinyl aromatic monomer (a) and said vinyl aromatic monomer (e) being selected from the group consisting of styrene, alphamethyl styrene, vinyl toluene, and vinyl naphthalene, said unsaturated nitrile (b) and said unsaturated nitrile (d) being acrylonitrile, said rubber (c) being selected from the group consisting of polybutadiene, polyisoprene, butadiene/isoprene copolymers, and ethylene-propylene and ethylene-propylene-diene elastomers, and the molecular weight of said polybutylene terephthalate being between 80,000 and 150,000 weight average molecular weight.

* * * * *